United States Patent [19]
Ito et al.

[11] Patent Number: 5,097,358
[45] Date of Patent: Mar. 17, 1992

[54] ELECTROCHROMIC ELEMENT

[75] Inventors: Toshiyasu Ito, Kasugai; Takaaki Mori, Inazawa; Mamoru Kato, Nagoya; Masanobu Senda, Aichi; Takahiko Asaoka, Nagoya, all of Japan

[73] Assignees: Toyoda Gosei Co., Ltd., Nishikasugai; Kabushiki Kaisha Toyota Chuo Kenkyusho, Aichi, both of Japan

[21] Appl. No.: 514,225

[22] Filed: Apr. 25, 1990

[30] Foreign Application Priority Data

Apr. 27, 1989 [JP] Japan ................... 1-108981

[51] Int. Cl.⁵ .............................. G02F 1/01
[52] U.S. Cl. ...................... 359/273; 359/265; 359/268; 359/275
[58] Field of Search ................ 350/357, 353

[56] References Cited

U.S. PATENT DOCUMENTS

| 4,304,465 | 12/1981 | Diaz | 350/357 |
|---|---|---|---|
| 4,573,768 | 4/1986 | Polak et al. | 350/357 |
| 4,664,934 | 5/1987 | Ito et al. | 437/38 |
| 4,750,816 | 6/1988 | Ito | 350/357 |
| 4,805,996 | 2/1989 | Carlson | 350/357 |
| 4,832,468 | 5/1989 | Ito et al. | 350/357 |
| 4,872,745 | 10/1989 | Fujisawa et al. | 350/357 |
| 4,874,229 | 10/1989 | Ito et al. | 350/357 |

FOREIGN PATENT DOCUMENTS 58-18618 2/1983 Japan ................... 350/357

Primary Examiner—Rolf Hille
Assistant Examiner—Mahshid Saadat
Attorney, Agent, or Firm—Cushman, Darby & Cushman

[57] ABSTRACT

An electrochromic element comprising a pair of electrode films, at least one of which is a transparent electrode film, a color forming film laminated between both the electrode films and an electrolyte. The color forming film is formed on the electrode film by depositing thereon a conductive metal oxide such as indium oxide and tungsten oxide. The depositing ratio of tungsten oxide and indium oxide preferably is within the range of 10:1 to 3:1 by weight ratio.

8 Claims, 1 Drawing Sheet

ELECTROCHROMIC ELEMENT

BACKGROUND OF THE INVENTION

1. Field of the Invention

The present invention relates to an electrochromic element used in various kinds of display units and dimmers.

2. Description of the Prior Art

Electrochromic elements known in the art include electrode pairs having at least one electrode made of a transparent electrode film, a color forming film made of tungsten oxide laminated on each electrode, and an electrolyte. When voltage is applied to the electrodes, the color forming film is chemically reduced and becomes blue. When reverse current is applied, the blue film is oxidized and becomes transparent.

With this type of electrochromic element, the use of tungsten oxide for the color forming film traditionally has been problematic, because even when voltage is not applied to the electrodes, the film becomes colored when it is irradiated with ultraviolet rays. As indicated by the following formulas:

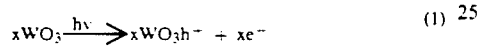

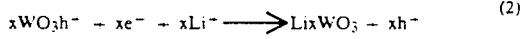

when a tungsten oxide film is irradiated with ultraviolet radiation, electrons (e⁻) are excited and positive holes (h⁻) are formed. The excited electrons (e⁻) combine with lithium ions Li⁺ and with hydrogen ions H⁺ to four tungsten bronze (LixWO₃). The formation of this material is believed to cause coloring problems.

For the reasons described above, when ultraviolet rays contact a transparent film of tungsten oxide, the film becomes colored. Furthermore, charging balances of the coloring and de-coloring reactions are affected, thereby causing deterioration of the electrochromic element.

SUMMARY OF THE INVENTION

An object of the present invention is to provide an electrochromic element for which the coloring reaction of a color-forming film can be prevented when no voltage is applied, even when the film is irradiated. Another object of this invention is to provide an electrochromic element which can be used for a longer period of time than those known in the art.

In order to achieve the above objects, an electrochromic element according to the present invention has at least two electrodes spaced apart from each other, at least one of which includes a transparent electrode film, an electrolyte providing conduction between electrodes, and a color forming film provided between the transparent electrode film and the electrolyte. The color forming film according to this invention contains conductive metal oxide.

The electrodes may be made of metals. The transparent electrode film may be made of indium tin oxide (ITO). Suitable electrolytes include any materials which may be lithium perchlorate (LiClO₄) or lithium tetrafluoroborate (LiBF₄). A liquid, solid or gel may be used. The color forming film may be tungsten oxide (WO₃), molybdenum oxide (MoO₃), vanadium oxide (V₂O₅), nickel oxide (NiOx), iridium oxide (IrOx), or viologen, and preferably is made of polyaniline, polypyrrole, polythiophene, or the like. The transparent electrode film and color forming film may be deposited by any suitable deposition or lamination technique. The conductive metal oxide can be any material which should be colorless and transparent and preferably is titanium oxide, zinc oxide, cadmium oxide, indium oxide, or tin oxide.

Other objectives of the present invention will become apparent in view of the preferred embodiments discussed below and the appended claims. Further, other advantages not mentioned in this specification will become obvious to one skilled in the art upon application of the present invention.

DETAILED DESCRIPTION OF THE PREFERRED EMBODIMENT

Figure 1:
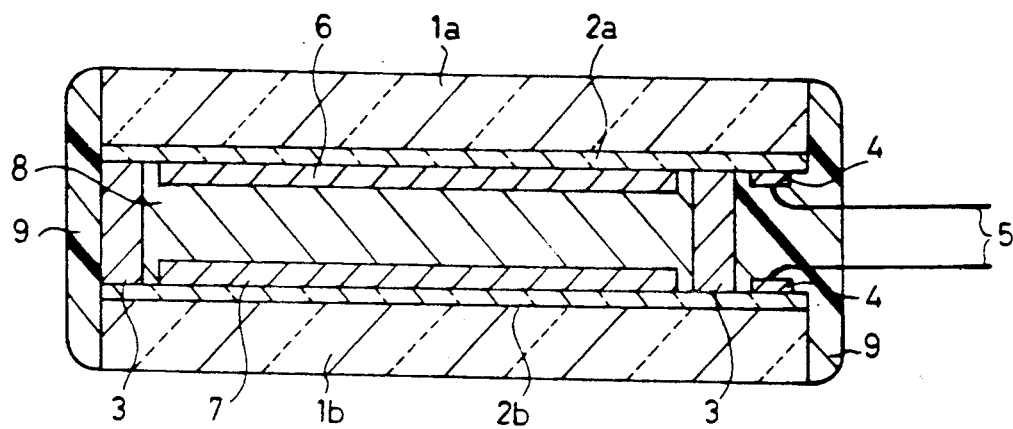
FIG. 1 is a cross-sectional view showing an electrochromic element of a first embodiment of the present invention.

A preferred embodiment of the present invention is described below with reference to the drawings.

A preferred electrochromic element of the present invention comprises a pair of transparent substrates 1a and 1b made of synthetic resin, several non-limiting examples of which include polymethyl methacrylate, polycarbonate, and preferably glass. Transparent electrode films 2a and 2b are laminated on a lower surface of the substrate 1a and on an upper surface of the substrate 1b, using an ion plating method or the like. Both of the transparent electrode films 2a and 2b are formed of Indium Tin Oxide (ITO), which is indium oxide (In₂O₃) including tin oxide (SnO₂) of 5 percent by weight. The substrates 1a and 1b, on which both the transparent electrode films 2a and 2b are formed, are spaced apart from each other a predetermined distance with a spacer 3 therebetween. The spacer can be made of any suitable nonconductive material, for example polyamide tape. A pair of wires 5 are attached to electrode-takeout portions 4 located at one end of each transparent electrode film 2a and 2b.

An oxidative color forming film 6 made of polyaniline is laminated on transparent electrode film 2a using any suitable technique, preferably by electrolytic polymerization.

A reductive color forming film 7 is formed on transparent electrode film 2b. This reductive color forming film 7 is formed by dually depositing tungsten oxide and a conductive metal oxide using any suitable technique, preferably an electron beam method. The deposition ratio is preferably tungsten oxide: conductive metal oxide=10:1 to 3:1 (ratio by weight). Other ratios may be used, however, if a higher ratio is used, some coloring may occur upon irradiation when no voltage is applied, and if a lower ratio is used, the degree of coloring of film 7 will be lessened when voltage is applied.

In the most preferred embodiment, indium oxide is used as the conductive metal oxide, and two kinds of reductive color forming film 7 are produced wherein the depositing ratios thereof are tungsten oxide: indium oxide=6:1 and 3:1 (ratio by weight).

Electrolyte 8 is provided in a space surrounded by both the color forming films 6 and 7 and the spacer 3. In the preferred embodiment, electrolyte 8 is a gelled material which is formed by hardening an ultraviolet setting resin mixed in an organic electrolytic solution, which are made by dissolving lithium perchlorate (LiClO$_4$), lithium tetrafluoroborate (LiBF$_4$), and so on of about 1M of concentration in propylene carbonate. A sealing member 9, made of epoxy resin, seals the outside of spacer 3.

In the electrochromic element described above, when positive DC voltage is applied between the oxidative color forming film 6 and reductive color forming film 7 via wire 5, an oxidation reaction occurs at the oxidative color forming film 6, and a reduction reaction occurs at the reductive color forming film 7, so that both color forming films 6 and 7 are colored blue. When negative DC voltage is applied between films 6 and 7, these films lose their color as reverse reactions occur.

Figure 2:
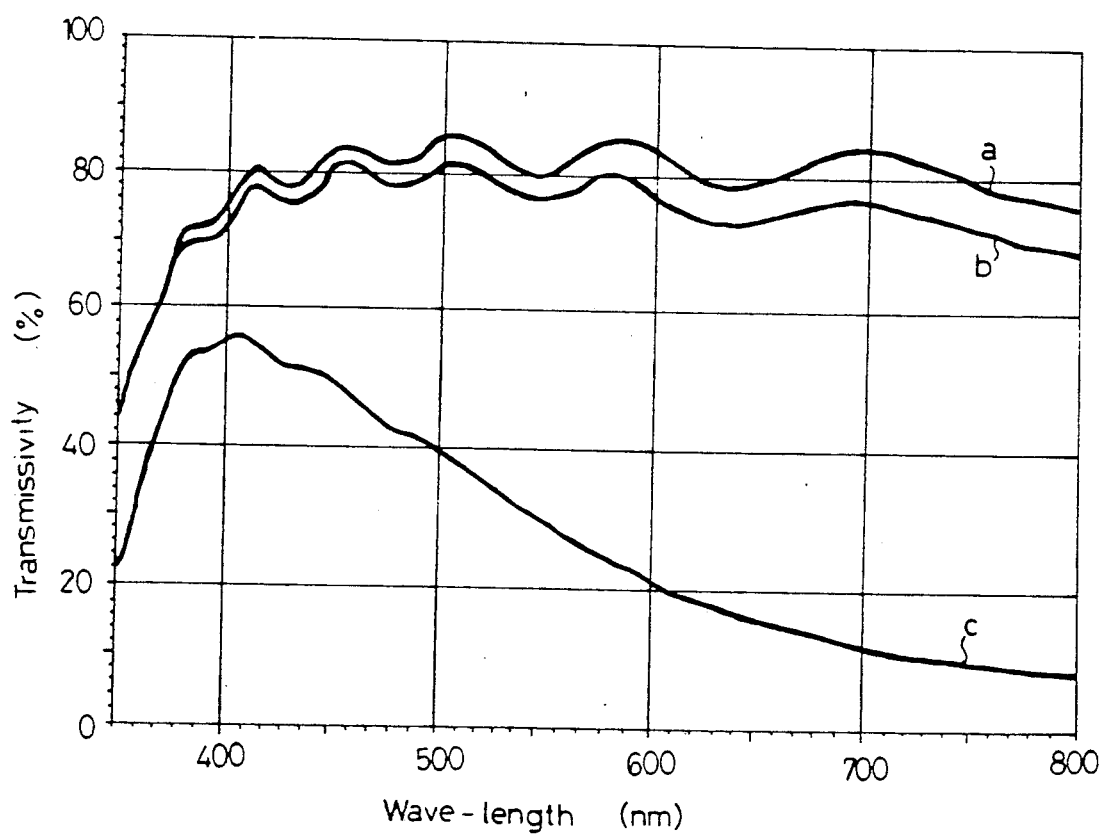
FIG. 2 is a graph showing the relationship between wave-lenght of light irradiated to the element (nm) and transmissivity (%) for the electrochromic element of FIG. 1.

When voltage is not applied to the electrochromic element of the present embodiment, irradiation with ultraviolet rays will not color the element. In order to confirm this, changes of transmissivity affected by irradiation with ultraviolet rays (wave length 300-400 nm) were measured using samples of the reductive color forming film 7. The results are shown in FIG. 2. Two samples were used. One (I) was a reductive color forming film 7 formed only of tungsten oxide. The other (II) was a reductive color forming film 7 formed of mixture of tungsten oxide and indium oxide deposited at a ratio of tungsten oxide: indium oxide = 6:1 (ratio by weight). In FIG. 2, code a represents the transmissivity, with light of a predetermined range of wave length (350-800 nm), of the both samples (I) and (II) before the irradiation of ultraviolet ray, b represents changes of the transmissivity of the sample (II) after the irradiation of ultraviolet ray, and c represents changes of the transmissivity of the sample (I) after the irradiation of ultraviolet ray.

As clearly shown in this figure, when sample (I), formed only of tungsten oxide, was irradiated with ultraviolet rays, the transmissivity thereof was lowered significantly and the sample (I) became colored (changed from a to c in FIG. 2). On the other hand, when sample (II), made of the mixture of tungsten oxide and indium oxide, was irradiated with ultraviolet rays, the transmissivity thereof was changed only slightly (changed from a to b in FIG. 2).

As described above, it is believed that the electrochromic element according to this invention will not be colored even if it is irradiated because the reactions expressed as formula (2) do not happen, and because recombination reactions expressed as a formula (3) below:

$$xWO_3h^+ + xe^- \rightarrow xWO_3 \qquad (3)$$

which is a reverse reaction of the formula (1), is what predominantly occurs. It is believed that when ultraviolet rays are directed to the reductive color forming film 7, electrons and positive holes are produced in the tungsten oxide and try to react on H$^+$ and Li$^+$ in the electrolyte 8. In the reductive color forming film 7, however, indium oxide is included as conductive metal oxide, and this indium oxide acts to make the electrons (e$^-$), which are at once excited, recombine with excited tungsten oxide WO$_3$h$^-$ before the excited electrons (e$^-$) react according to formula (2).

Thus, in the electrochromic element of the present embodiment, the reductive color forming film 7 will not become colored, even when it is irradiated, so that its endurance may be improved without deterioration of the charging balances.

In the electrochromic element of the present embodiment, the reductive color forming film 7 may be formed by depositing a composite material, which is tungsten oxide (WO$_3$) including tin oxide (SnO$_2$) of 10 percent by weight, using an electron beam method.

In accordance with this modification, an electrochromic element can be obtained that has a constant dope amount with resultant stable composition.

As many different embodiments of the present invention can be attained without departing from the spirit and scope of this invention, it is to be understood that the invention is intended to cover various modifications and equivalent arrangements included within the spirit and scope of the appended claims.

What is claimed is:

1. An electrochromic element comprising:
a first electrode and a second electrode having a space therebetween, said first electrode including a transparent electrode film;
an electrolyte disposed in said space between said first electrode and said second electrode; and
a color forming layer in contact with and disposed between said first electrode and said electrolyte, said color forming layer including a mixture of a color forming material and a conductive metal oxide.

2. An electrochromic element according to claim 1, wherein said conductive metal oxide includes tin oxide.

3. An electrochromic element according to claim 1, wherein said conductive metal oxide includes indium oxide.

4. An electrochromic element according to claim 1, wherein said color forming material is tungsten oxide.

5. An electrochromic element according to claim 1, wherein the mixture ratio of said color forming material to said conductive metal oxide is in the range from 10:1 to 3:1 by weight.

6. An electrochromic element according to claim 1, further comprising an oxidative color forming layer disposed between said second electrode and said electrolyte.

7. An electrochromic element comprising:
a first electrode and a second electrode having a space therebetween, said first electrode including a transparent electrode film;
an electrolyte disposed in said space between said first electrode and said second electrode; and
a color forming layer in contact with and disposed between said first electrode and said electrolyte, said color forming layer including a mixture of tungsten oxide acting as a color forming material and a conductive metal oxide selected from the group consisting of tin oxide and indium oxide, wherein the mixture ratio of the tungsten oxide to the conductive metal oxide is in the range of 10:1 to 3:1 by weight.

8. An electrochromic layer according to claim 7, further comprising an oxidative color forming layer formed of polyaniline disposed between said second electrode and said electrolyte.

* * * * *